United States Patent Office 3,277,170
Patented Oct. 4, 1966

3,277,170
PREPARATION OF DIPHENYLPHOSPHINOUS AZIDE AND POLYMERS DERIVED THEREFROM
Kazimiera J. L. Paciorek and Reinhold H. Kratzer, Riverside, Calif., assignors to the United States of America as represented by the Secretary of the Navy
No Drawing. Original application Oct. 24, 1963, Ser. No. 318,767, now Patent No. 3,211,753, dated Oct. 12, 1965. Divided and this application Apr. 29, 1965, Ser. No. 461,572
2 Claims. (Cl. 260—561)

The invention herein described may be manufactured and used by or for the Government of the United States of America for governmental purposes without the payment of any royalties thereon or therefor.

This is a division of application Serial No. 318,767, filed October 24, 1963, now U.S. Patent 3,211,753.

The present invention relates to elastomers and more particularly to a method for the synthesis of diphenylphosphinous azide of the formula $(C_6H_5)_2PN_3$ to be used subsequently in the preparation of thermally stable phosphonitrilic polymers which are useful as lubricants, sealing agents, and elastomers having improved stability and thermal characteristics.

Diphenal phosphinous azide, as prepared by the method disclosed herein, can be reacted with chain terminating agents; i.e., trivalent phosphorus derivatives thus avoiding ring formation and resulting in linear polymers.

Diperfluoromethylphosphinous azide $(CF_3)_2PN_3$ was synthesized by C. M. Douglas, G. Tesi and C. P. Haber, as disclosed in U.S. Patent No. 3,087,937; however, their procedure used for the synthesis of $(CF_3)_2PN_3$ could not be applied to $(C_6H_5)_2PN_3$ since the latter decomposes with the formation of mainly cyclic products under the conditions under which $(CF_3)_2PN_3$ was isolated.

It is an object of the invention to provide a method for the synthesis of $(C_6H_5)_2PN_3$.

Another object of the invention is to provide an improved elastomer having improved stability and thermal characteristics, and a method of producing same.

It is also an object of the invention to provide preparation of linear chains by reacting diphenylphosphinous azide with phosphine derivatives.

A further object of the invention is to provide the synthesis of an intermediate for use in the preparation of thermally stable phosphonitrilic polymers.

Other objects and many of the attendant advantages of this invention will become readily appreciated as the same becomes better understood by reference to the following detailed description.

A procedure for the synthesis of diphenylphosphinous azide $(C_6H_5)_2PN_3$ is disclosed in Example I, as follows,

Example I

The apparatus employed consisted of a 150-ml. flask equipped with a horizontal sidearm with a sealed-in sintered glass disc, and a ground joint which permitted the attachment of another similar flask.

In the first flask 1.24 g. of finely powdered lithium azide was suspended in 25 ml. of acetonitrile. To this vigorously stirred mixture was added diphenylphosphinous chloride (1.229 g.) in acetonitrile (10 ml.) over a period of 45 minutes. A mercury valve protected the system from the atmosphere. The stirring was continued for 7 hours at −18 to −14° C., during which period no pressure change could be observed. An aliquot withdrawn at that time was examined by infrared spectroscopy, a strong absorption at 4.78μ indicated the presence of an azide group attached to trivalent phosphorus. After the connection to the mercury valve was sealed, the system was attached to the vacuum line and acetonitrile was removed completely at −18° C. n-pentane 55 ml. was distilled onto the residue at −196° C., the system was subsequently warmed to −20° C. for 1 hour, and the solution filtered into the second 150-ml. flask. There the product diphenylphosphinous azide $(C_6H_5)_2PN_3$, was crystallized from the solution by cooling to −78° C. and the mother liquor was filtered off. A portion of this solid was dissolved in n-butane and its molecular weight was determined by vapor pressure lowering technique.

Found: 276
Calcd.: for $(C_6H_5)_2PN_3$ 227

Another portion of this solid was warmed slowly from −15° C. in a clear sight Dewar flask; at 13.5–13.8° C. It discolored deep yellow with simultaneous nitrogen evolution (identified by mass spectrometry). Subsequently the flask was heated for 2 hours at 170° C. to drive the decomposition to completion. Amount of phosphorus in the decomposed sample—0.572 mole. Amount Amount of nitrogen given off—0.625 mole.

Ratio of N:P=1.09:1
Percent of nitrogen in the decomposed sample—6.89%.
Calcd. for $[C_6H_5)_2PN]_n$ moiety—7.03%.

No $N_3^-$, $Cl^-$ or $Li+$ was present in the decomposed residue.

The process for preparation of linear chains by reacting diphenylphosphinous azide with phosphine derivatives can be represented as follows:

$n(C_6H_5)_2PN_3 + R'R''R'''P$
$\rightarrow (C_6H_5)_2P\text{—}N\!=\![(C_6H_5)_2P\text{—}N\!=\!]_n PR'R''R'''$ The groups R′, R″, R‴ can all be the same or different and these can be either alkyl, aryl, aryloxy, alkoxy, their fluorinated analogues, hydrogen or halogen. The particular preparation described below in Example II, concerns the formation of

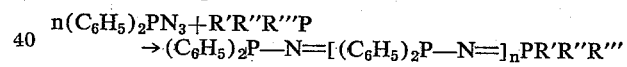
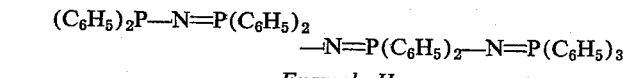

Example II

Using the same apparatus and procedure as described in Example I, diphenylphosphinous chloride (1.843 g.) was reacted with lithium azide (0.6 g.) in acetonitrile at ca. −20 to −25° C. The acetonitrile solution containing now $(C_6H_5)_2PN_3$ was filtered under nitrogen atmosphere onto a solution of triphenylphosphine (3.2 g.) in acetonitrile (40 ml.) also at −25° C. The resulting solution was put into an ice bath, connected to a mercury valve and stirred vigorously. A rapid gas evolution was observed. The temperature of the solution was allowed to raise slowly to room temperature. No precipitate was observed on completion of the reaction.

Acetonitrile was removed by evaporation on the vacuum line and the product was separated from unreacted triphenylphosphine by sublimation, and by boiling with ligroine. The ligroine insoluble residue M.P. 57–61° C. was mainly $[(C_6H_5)_2PN]_3P(C_6H_5)_3$.

*Analysis.*—Calcd. $[(C_6H_5)_2PN]_3P(C_6H_5)_3$: C, 75.43; H, 5.29; P, 14.40; N, 4.89; mol. wet 860. Found: C, 74.0; H, 5.42; P, 14.08; N, 4.90; mol. wt. 785.

Obviously many modifications and variations of the present invention are possible in the light of the above teachings. It is therefore to be understood that within the scope of the appended claims the invention may be practiced otherwise than as specifically described.

What is claimed is:

1. The synthesis of

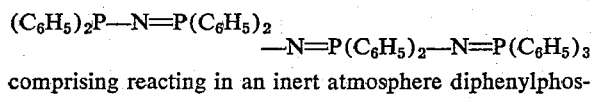

comprising reacting in an inert atmosphere diphenylphosphinous chloride with lithium azide in acetonitrile at −20 to −25° C., filtering the resulting mixture onto a solution of triphenylphosphine in acetonitrile at −25° C., placing the resulting solution in an ice bath and stirring vigorously, slowly raising temperature of solution to room temperature, removing the acetonitrile by evaporation under vacuum and separating the product $$[C_6H_5)_2PN]_3P(C_6H_5)_3$$

from unreacted triphenylphosphine.

2. The compound $[(C_6H_5)_2PN]_3P(C_6H_5)_3$.

No references cited.

WALTER A. MODANCE, *Primary Examiner.*
HARRY I. MOATZ, *Assistant Examiner.*